United States Patent [19]
Whited

[11] Patent Number: 5,533,746
[45] Date of Patent: Jul. 9, 1996

[54] TETHERED COVER FOR A PANEL OPENING IN AN AIR BAG INFLATOR SYSTEM

[75] Inventor: Timothy J. Whited, Auburn Hills, Mich.

[73] Assignee: Morton International, Inc., Chicago, Ill.

[21] Appl. No.: 374,930

[22] Filed: Jan. 18, 1995

[51] Int. Cl.⁶ .................................................. B60R 21/16
[52] U.S. Cl. ................................. 280/728.2; 280/728.3
[58] Field of Search ....................... 280/728.1, 728.3, 280/731, 732, 728.2

[56] References Cited

U.S. PATENT DOCUMENTS

| | | | |
|---|---|---|---|
| 3,822,894 | 7/1974 | Muller et al. | 280/731 |
| 3,944,250 | 3/1976 | Wulf et al. | 280/732 |
| 4,893,833 | 1/1990 | DiSalvo et al. | 280/732 |
| 4,911,471 | 3/1990 | Hirabayashi | 280/732 |
| 4,964,653 | 10/1990 | Parker | 280/732 |
| 5,064,217 | 11/1991 | Shiraki | 280/728.3 |
| 5,072,967 | 12/1991 | Batchelder et al. | 280/732 |
| 5,096,221 | 3/1992 | Combs et al. | 280/732 |
| 5,150,919 | 9/1992 | Sakakida et al. | 280/732 |
| 5,195,776 | 3/1993 | Sakakida et al. | 280/732 |
| 5,199,739 | 4/1993 | Fujiwara et al. | 280/732 |
| 5,211,421 | 5/1993 | Catron et al. | 280/732 |
| 5,219,177 | 6/1993 | Wang | 280/732 |
| 5,242,191 | 9/1993 | Faigle et al. | 280/732 |
| 5,372,379 | 12/1994 | Parker | 280/728.3 |
| 5,385,366 | 1/1995 | Frank et al. | 280/728.3 |

FOREIGN PATENT DOCUMENTS

| | | | |
|---|---|---|---|
| 00415362A2 | 8/1990 | European Pat. Off. | 280/728.3 |
| 3843686A1 | 6/1990 | Germany . | |

Primary Examiner—Paul N. Dickson
Attorney, Agent, or Firm—Philip C. Peterson; Henry W. Tarring, II; Gerald K. White

[57] ABSTRACT

A tethered cover of an airbag inflator system designed to fit in an opening in the instrument panel of a motor vehicle is described. The cover has one or more metal attachment rods which extend along opposite edges of the panel opening. Parts of the rods are sandwiched between an outer substrate and a metal inner substrate provided in the cover. Other parts of the rods are exposed opposite the edge of the panel opening to permit engagement with fasteners on the panel which secure the cover in a closed position. The cover also has a metal tether attachment rod, a portion of which is sandwiched between the inner and outer substrates while a further outer portion is exposed for attachment to a loop at one end of a flexible tether. The cover is strong and is easy to assemble despite possible variations in the tolerances of cover attachment fasteners.

27 Claims, 3 Drawing Sheets

TETHERED COVER FOR A PANEL OPENING IN AN AIR BAG INFLATOR SYSTEM

BACKGROUND OF THE INVENTION

1. Field of the Invention

The present invention relates to a new and improved tethered cover for a motor vehicle panel opening for an air bag inflator system. More particularly, the tethered cover is especially strong to avoid fracturing or breakage during air bag deployment and the unique tether attachment arrangement permits a loop to be pre-stitched into an end portion of a belt-like tether strap so that the loop may be slipped over a tether attachment rod which is sandwiched between an inner structural substrate of metal and an outer panel surface supporting substrate which can be fabricated of a dissimilar metal if desired. One or more attachment rods are provided along opposite edges of the cover with portions thereof sandwiched between the inner and outer substrates and other portions are exposed through openings provided in the inner substrate for holding engagement with spring-type fasteners mounted on a vehicle panel located along the edges of a panel opening for holding the cover in a covering or closed position until air bag inflation occurs.

2. Background of the Prior Art

U.S. Pat. No. 3,822,894 to Muller et al. discloses a steering wheel having a built-in air cushion employing a strong hinge between a cover and a dish containing the air bag so that on inflation, the cover is pushed away but not completely liberated from attachment to the steering wheel.

The Wulf et al., U.S. Pat. No. 3,944,250, discloses an automatically inflatable gas cushion for the protection of passengers in vehicles employing a cover which is opened upon inflation of the air bag or gas cushion and which is retained by a flexible band so that the cover is restrained after opening.

The DiSalvo et al., U.S. Pat. No. 4,893,833, discloses a closure for an air bag deployment opening wherein an integral aluminum hinge flange on the closure is bolted to the frame of the vehicle permitting pivotal opening movement of the closure.

The Hirabayashi, U.S. Pat. No. 4,911,471, discloses an arrangement of an air bag device in a motor vehicle wherein angular pivotal movement of a door over the air bag is restricted by a strap to limit the angular degree of opening when the air bag is inflated.

U.S. Pat. No. 4,964,653 to Parker discloses a self-skinned foam closure element for an inflatable restraint door assembly having a combination hinge and tether for restraining travel of the closure element during air bag deployment.

U.S. Pat. No. 5,064,217 to Shiracki discloses a cover for an air bag unit having "Nylon" yarn bands molded in place and wrapped around a retaining band of resin provided on the air bag enclosure or housing.

U.S. Pat. No. 5,150,919 to Sakakida et al. discloses an air bag system for a vehicle having a pair of doors or lids which pivotally open in opposite direction and which are restrained by belt members so that the lids pivot about transverse axes and open smoothly upon air bag deployment.

U.S. Pat. No. 5,195,776 to Sakakida et al. discloses an air bag installation having curved air bag cover lids which are reliably opened by rotation about a center point so as not to restrict the inflation of the air bag.

U.S. Pat. No. 5,072,967 to Batchelder et al. discloses an instrument panel having an invisible air bag deployment door with weakened sections formed therein but hidden from view for facilitating fracture of the door along predetermined lines for opening movement during air bag deployment.

The Combs et al., U.S. Pat. No. 5,096,221, discloses an air bag door having plural substrates on the inside which normally retain the door in a closed position and at least one of which is notched or provided with a hidden tear seam to facilitate fracture for opening of the door.

The Catron et al., U.S. Pat. No. 5,211,421, discloses an air bag cover door retainer having bifurcated engagement flanges on the door normally retaining the door in a closed position and releasable to permit door opening during air bag deployment.

The Fujiwara et al., U.S. Pat. No. 5,199,739, discloses an air bag cover opening mechanism for a motor vehicle including a sheer pin which is severed upon opening pressure exerted on the inside of the door by the deploying air bag.

The Wang, U.S. Pat. No. 5,219,177, discloses a releasable latch for an air bag deployment door which is activated by air bag deployment to permit the door to open.

Faigle et al. U.S. Pat. No. 5,242,191, discloses a tethered air bag cover system wherein the cover is retained after opening attached to the air bag itself.

European Patent Application No. EPO 0415 362 A2 discloses an air bag supporting system having two fly-away covers restrained by loose flexible straps.

German Patent No. DE 38 43 686 A1 discloses an air bag cover for a car which is retained in one piece in relation to the dashboard of the automobile by a retaining hinge element.

OBJECTS OF THE INVENTION

Accordingly, it is an object of the present invention to provide a new and improved tethered cover air bag system for motor vehicles and the like and more particularly, to provide an air bag system having a cover for normally protecting the air bag but bodily movable to permit the bag to deploy outwardly when desired to protect an occupant of the vehicle.

It is another object of the present invention to provide an air bag system of the character described having a flexible tether connected between the cover and a panel of the vehicle or an air bag housing in the vehicle so that the amount of movement of the cover away from the closed position is limited or restrained.

Yet another object of the present invention is to provide a new and improved tethered cover for an air bag system wherein load spreading means is provided for attaching the tether to the cover so that the cover does not fracture or break apart during deployment of the air bag.

Still another object of the present invention is to provide a new and improved air bag system having a tethered cover which floats relative to an air bag inflator module mounted behind an instrument panel of a vehicle and thus is easy to assemble in place over an instrument panel opening and is thus not dependent on or affected by module attachment tolerances relative to the vehicle structure.

Moreover, another object of the present invention is to provide a new and improved air bag system having a tethered cover which floats relative to an air bag deployment opening in the instrument panel of the vehicle so that the overall fit and finish of the cover is not controlled by the particular tolerances relating to the locations of attachment clips relative to the panel opening.

Yet another object of the present invention is to provide a new and improved air bag system having a tethered cover which has a novel fastening arrangement for permitting movements of the panel relative to the instrument panel opening to accommodate tolerances in location of the panel opening relative to the air bag inflator module and tolerance variations between the panel opening and fastening clips around the edges thereof.

Another object of the present invention is to provide a new and improved air bag system having a tethered cover which normally limits the amount of travel of the cover away from the panel of the vehicle when the air bag is deployed.

Another important object of the present invention is to provide a new and improved tethered cover of the character described having an inner substrate of metal and an outer surface supporting substrate joined thereto and a tether attachment element having a portion sandwiched between the substrates.

Yet another important object of the present invention is to provide a new and improved tethered cover of the character described including a tether strap with a loop pre-stitched in an outer end portion and slipped over a portion of an attachment element sandwiched between inner and outer substrates of the cover.

Still another important object of the present invention is to provide a new and improved tethered cover of the character described having inner and outer substrates formed of the same or dissimilar metal.

Yet still another important object of the present invention is to provide a new and improved tethered cover of the character described include a cover attachment element having a portion sandwiched between an inner and outer substrate and another portion exposed for engaging a fastening element on a vehicle panel for securing the cover in place over a panel opening for an air bag to be deployed through the opening.

BRIEF SUMMARY OF THE PRESENT INVENTION

The foregoing and other objects and advantages of the present invention are accomplished in a new and improved tethered cover for a panel opening in a motor vehicle for an air bag inflator system, comprising an inner metal substrate on the inside of the cover normally closing the panel opening until forced to open by pressure from an inflating air bag upon deployment to move outwardly through the panel opening. An outer substrate is attached to the inner substrate and supports an outer face of the cover which generally matches the surrounding panel. At least one metal attachment element or rod extends along one or both edges of the panel opening and the rod has at least one portion sandwiched between the substrates. The attachment rod has at least one other portion exposed through an attachment opening of the inner substrate to face an edge portion along the panel opening for engagement with fastening clips thereon for securing the cover in place in a closed position over the vehicle panel opening. The exposed portion of the attachment rod(s) are movable relative to the attachment clips adjacent the panel opening and permit position adjustment of the cover in a closed position to accommodate tolerances in the position of the opening in the instrument panel of the vehicle and the attachment clips relative to the air bag inflator.

At least one flexible tether is provided having an outer end portion for restraining travel of the cover away from the panel opening when opened by the air bag and connected to a tether attachment rod of metal on the panel. The tether attachment rod has a portion sandwiched between the inner and outer substrates and another portion exposed through a tether access opening on the inner substrate so that the tether can be looped around the rod prior to securing the inner and outer substrates together. This arrangement provides an exceptionally strong, non-fracturing cover which is easily mounted in place over the panel opening, and which is firmly tethered for limited travel away from the panel opening when the air bag is inflated.

BRIEF DESCRIPTION OF THE DRAWINGS

For a better understanding of the present invention, reference should be had to the following detailed description taken in conjunction with the drawings, in which.

DETAILED DESCRIPTION OF PREFERRED EMBODIMENTS OF THE PRESENT INVENTION

Figure 4:
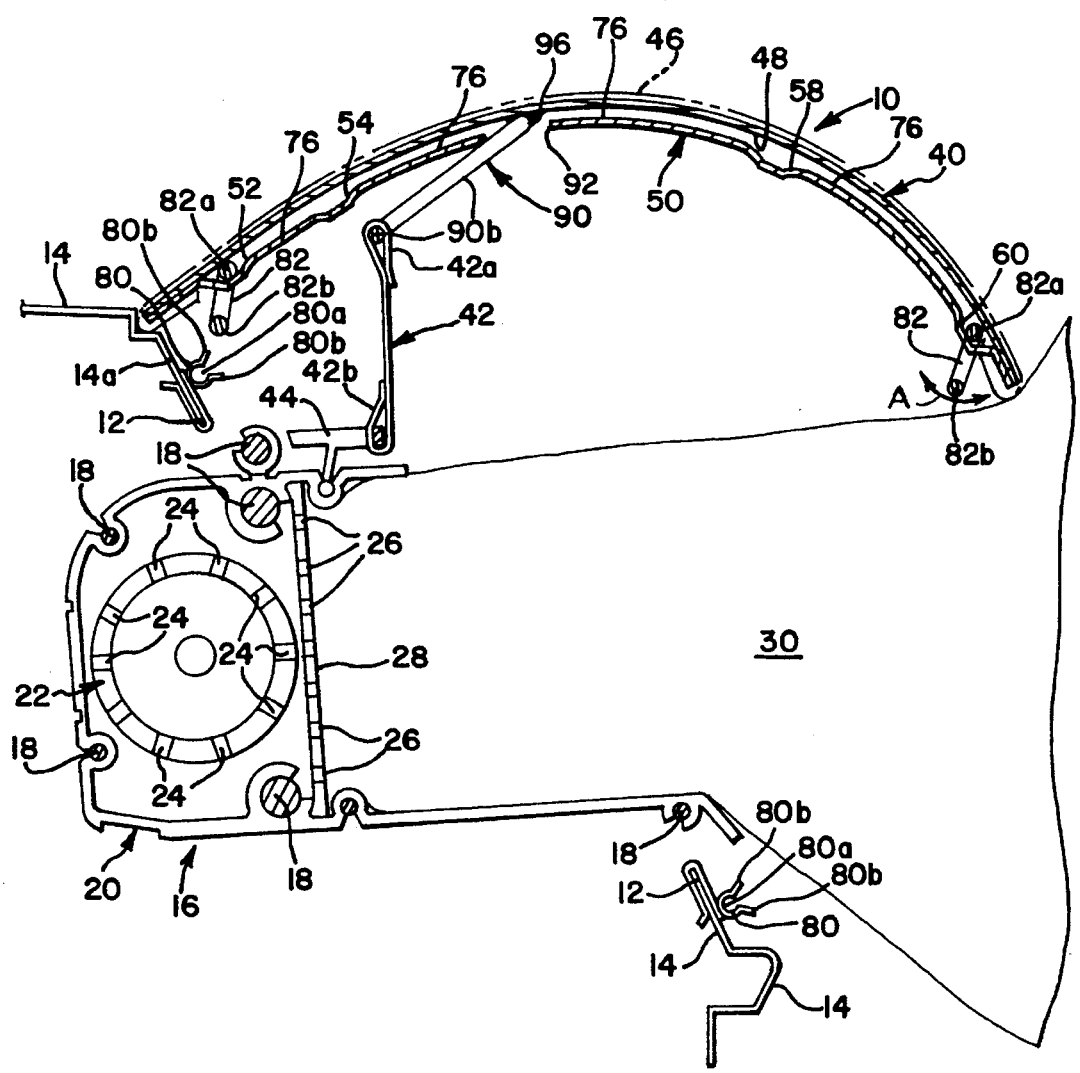
FIG. 4 is a transverse cross-sectional view similar to FIG. 1 but illustrating the tethered cover in an open position after inflation of the air bag has commenced.

Referring now more particularly to the drawing, therein is illustrated a new and improved tethered cover 10 for normally closing a panel opening 12 formed in an instrument panel 14 in a motor vehicle equipped with an air bag inflator module 16 fixedly secured behind the panel opening with suitable means such as fasteners 18 extending from lateral support brackets (not shown). The air bag inflator module 16 includes a housing 20 for holding a gas generating device 22 having a plurality of discharge ports 24 for rapidly discharging generated gas when the device is activated in a vehicle emergency. The gas generator 22 contains a quantity of solid gas generant material which is ignited by an electrically activated ignition system in a vehicle emergency and the gas flows out through the discharge ports 24 and through ports 26 in a diffuser wall 28 to rapidly inflate an air bag cushion 30 (FIG. 1) which moves rapidly outwardly through the panel opening 12 (FIG. 4). The cover 10 is designed to float or move horizontally and vertically relative to the inflator module 16 and the panel opening 12 to accommodate manufacturing tolerances of the associated motor vehicle when the cover is in a closed position because of a unique fastening system described hereinafter.

In accordance with the present invention, the panel opening 12 is normally closed with a new and improved, exceptionally strong door or cover 40 which remains intact and does not fracture or fragment when rapidly pushed open (FIG. 4) by the high pressure exerted by the inflating air bag 30 expanding rapidly outwardly through the panel opening 12. The high strength cover 40 is restrained upon opening and the distance of movement away from the closed position of FIG. 1 to the open position of FIG. 4 is limited by one or more tethers 42 formed of strong, flexible webbing material with a pre-stitched loop 42a at an outer free end portion and a similar loop 42b at an inner end portion attached to a clip 44 mounted securely on an upper wall of the housing 20.

The improved tethered cover 40 has an outwardly convex, transverse, vertical cross-section as illustrated and has an outer layer 46 of resinous plastic material, colored and decorated to match the surrounding panel or dashboard 14. The outer layer 46 may be adhesively secured to a first supporting substrate 48 formed of strong lightweight sheet metal such as aluminum or steel and designed to smoothly support the outer decorative layer which also may be integrally molded thereon. The first substrate 48 has a generally smooth inner and outer face, is generally rectangular in shape when cut from sheet stock and thereafter is pressed or stamped to the illustrated arcuately curved transverse (vertical) cross-section. The outer decorative layer 46 of plastic material extends around the peripheral edges of the first substrate 48 to provide a smooth outer peripheral edge for the cover 40.

In accordance with the features of the present invention, the cover 40 also includes a second or inner, structural substrate 50 (FIG. 3) formed of strong, thin sheet metal such as steel or aluminum stamped out of sheet stock to the shape as illustrated. The inner substrate 50 is press formed or stamped out to include a plurality of elongated, spaced apart, parallel, generally horizontally disposed, recesses or channels, 52, 54, 56, 58 and 60, and a plurality of elongated, parallel, spaced apart recesses or channels 62, 64, 66, 68, 70, 72, 74 lying in spaced apart, generally vertical planes intersecting the horizontally extending channels at right angles thereby forming a plurality of generally rectangular shaped lands 76 in an array or matrix pattern. All of the elongated recesses or channels are generally trapezoidal in transverse cross-section with the larger dimension of the trapezoid facing outwardly toward the outer, first substrate 48.

The channels formed in the structural metal substrate 50 provide depth or thickness for the cover 40 resulting in an extremely strong, durable but relatively lightweight structure. The cover 10 is easily installed in a closed position (FIG. 1) over the panel opening 12 after the air bag inflator module 16 is in place and is positively secured in the closed position until air bag deployment by means of a plurality of spring clips 80 which are permanently mounted on a panel edge flange 14a bordering the upper and lower horizontal edges of the generally rectangular shaped panel opening. Each clip 80 has a pair of outwardly divergent spring legs 80b joined together at inner end portions forming a partially circular in shape throat 80a (FIG. 4) designed to receive an elongated attachment rod 82 snap-fitted into the throat between the spring legs 80b of each clip 80 when the cover 10 is installed.

Figure 1:
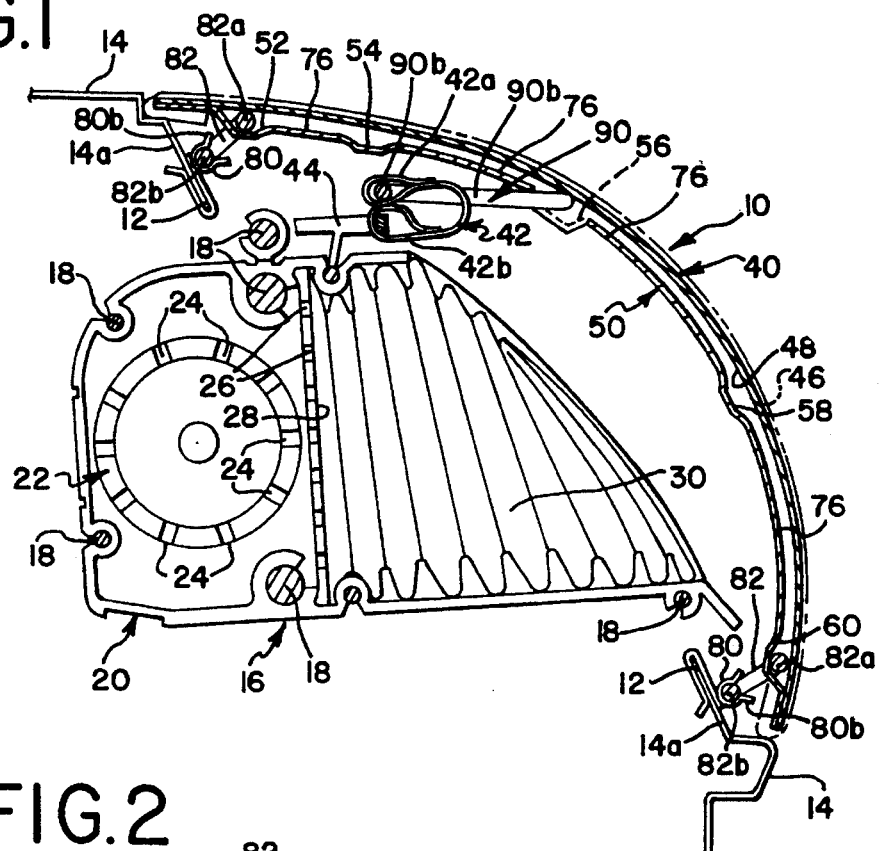
FIG. 1 is a transverse cross-sectional view of an air bag inflator system of a motor vehicle including a tethered cover for a panel opening in accordance with the features of the present invention and illustrating the cover in a closed position.
Figure 2:
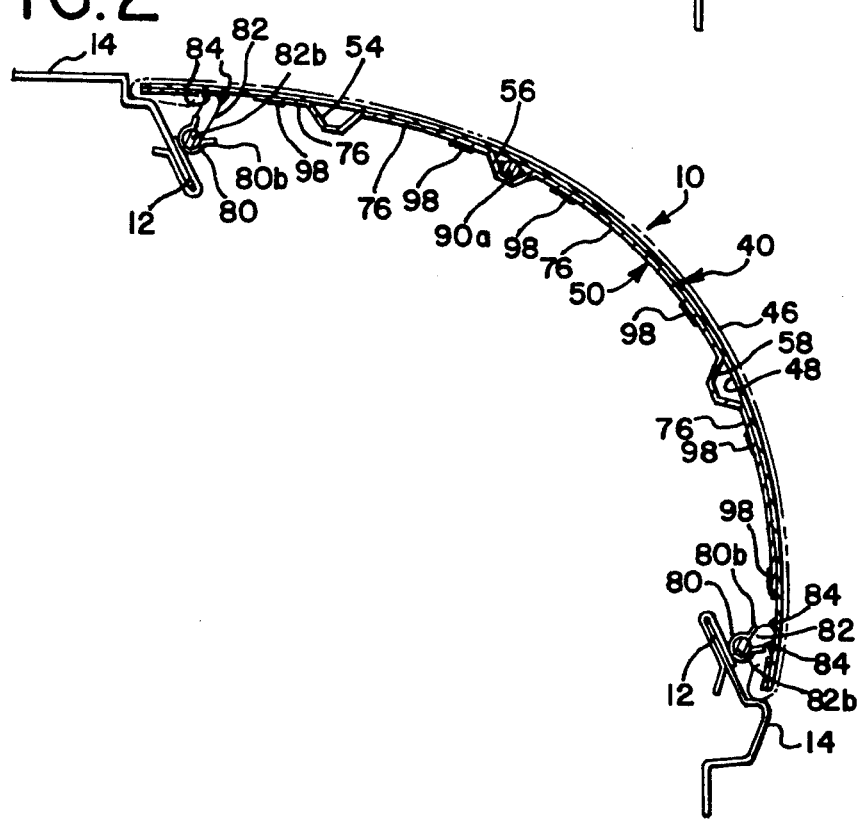
FIG. 2 is a cross-sectional view of the tethered cover taken substantially along lines 2—2 of FIG. 3.
Figure 3:
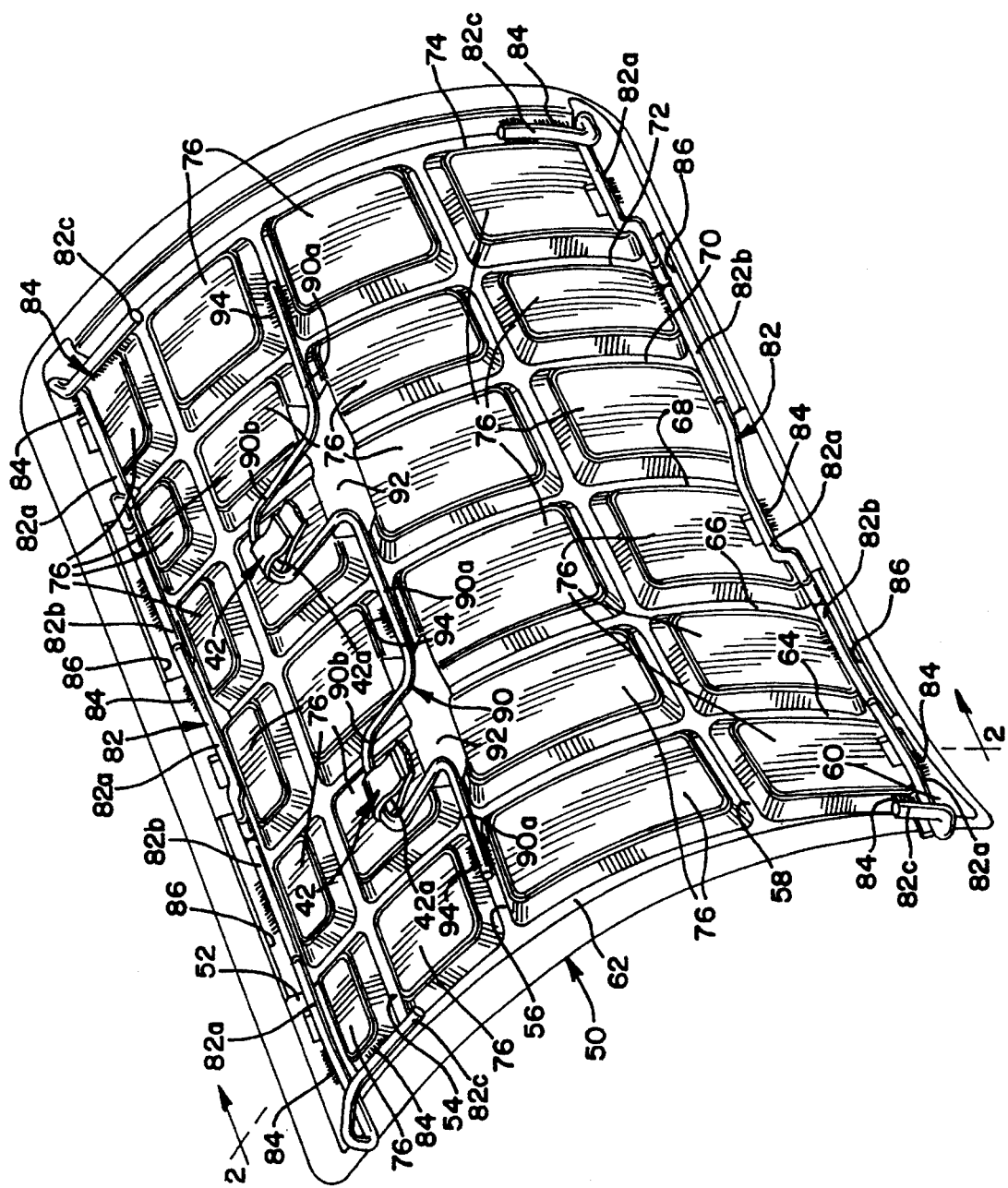
FIG. 3 is an isometric view of an inner metal substrate of the cover taken from a convex side showing cover attachment elements and a tether attachment element in place before the inner and outer substrates are assembled together.

The attachment elements 82 are formed of elongated steel rod or other strong metal material bent into a complex shape as best shown in FIG. 3 to extend generally horizontally along upper and lower edge portions of the cover 10 and seated in respective recesses 52 and 60 of the structural substrate 50. Intermediate portion 82a along the length of the attachment rods 82 between and outside of the clips 80 are sandwiched between the outer substrate 40 and the inner substrate 50 and may be welded (as at 84) to one or both of the substrates in these regions. At opposite ends of a central intermediate portion 82a of the attachment rods 82, the rods are bent inwardly to form attachment segments 82b adapted to snap-fit into a clip 80 for securing the cover 10 in place as shown in FIGS. 1 and 2. The spring clips 80 are relatively small in width or horizontal dimension in comparison to the horizontal length overall of the attachment segments 82b of the attachment rods 82 engaged therewith and this permits a floating horizontal connection or support of the cover 40 over the panel opening 12 to accommodate vehicle manufacturing tolerances. Moreover, because the attachment segments 82b of the attachment rods 82 are offset to be inwardly disposed yet parallel of the outer face of the cover 40, small adjustments in vertical position between the clips 80 and edges of the panel opening 12 can be accommodated to live within the vehicle manufacturing tolerances required because of (1) variations in positioning of the instrument panel 14 relative to air bag inflator module 16, (2) variations in location of the panel opening 12 on the instrument panel 14, and (3) variations in positioning of the retaining spring clips 80 in relation to the edges of the panel opening 12. As best shown in FIG. 4, the inwardly offset segments 82b may rotate (Arrow A) a slight amount relative to the segments 82a secured to the substrates 48 and 50 to provide for vertical floating action between the cover 40 on the one hand and the panel opening 12, the module 16 and the clips 80 on the other hand. At opposite ends of each attachment rod 82, there is provided an end portion 82c extended generally at right angles to the main body of the rod and the end portions are seated in the vertical recesses 62 and 72 of the structural substrate 50 and preferably are fixedly attached thereto by welding.

Adjacent each inwardly offset segment 82b of each attachment rod 82, the structural substrate 50 is formed with a large rectangular-shaped slot comprising a cover attachment opening 86 aligned with the recesses on channels 52 and 60 so that the attachment segments 82b of the rods 82 are exposed and accessible for easy alignment and engagement with the open pairs of legs 80b of the respective spring clips 80 when the cover 10 is mounted in place covering the panel opening 12. This arrangement permits the cover 10 to be easily mounted in place (FIGS. 1 and 2) with the rod segments 82b snapped into the throats 80a of the awaiting spring clips 80.

The attachment rods 82 provide additional strength and stiffness for the cover 10 along both horizontal upper and lower edges and vertically on both ends. Moreover, the rods 82 provide for easy attachment or mounting of the cover in place to close the panel opening 12. Because large portions 82a of the length of the attachment rods 82 are held in sandwiched relation between upper and lower edge portions of the metal substrates 40 and 50, an extremely strong, light-in-weight, non-fracturing cover structure is provided.

A strong, positive, interconnection between the cover 10 and the tether straps 42 is attained in accordance with the present invention by means of a generally horizontally extending tether attachment rod 90 spaced between the rods 82 and seated in a central horizontal recess 56 with portions 90a sandwiched between the inner and outer substrates 50 and 40, respectively. The rod 90 is formed with U-shaped inwardly projecting offset portion 90b which project through tether access openings 92 formed in the structural substrate 50 spaced along the recess 56 as best shown in FIGS. 3 and 4. The openings 92 permit the pre-stitched looped outer end portions 42a of the tether straps 42 to be first slipped onto the bight portions of the U-shaped offsets 90b and then passed through the openings for attachment to the clips 44. After the tether straps 42 are in place as described and the U-shaped portions 90b have been extended through the openings 92, the sandwiched portions 90a of the tether attachment rod 90 may be welded to the inner substrate 50 at several locations 94 or may be welded as at 96 (FIG. 4) to the outer substrate 46.

After the tether attachment rod 90 with tethers 42 attached is in place and after the cover attachment rods 82 are in place as previously described, the inner and outer substrates 40 and 50 are assembled together and may be spot welded together as at 98 to provide an extremely strong, light-in-weight, laminated, tethered cover 10. The outer decorative plastic layer 46 matching the panel 14 of the vehicle may then be molded onto the outer surface of the outer substrate 40 or otherwise adhesively secured and folded around the peripheral edges of the structure. The inner and outer substrates 50 and 40 can be formed of the same or different metal and the attachments rods 82 and 90 can be of the same or different types of metals. Because of the sandwich construction of the rod portions 92a and 90a between the inner and outer substrates 50 and 40 welding may not be required, however, welding attachment of the rods to one or both of the substrates can be easily accomplished when desired.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A cover for covering an opening in a panel adjacent to an air bag inflator system, comprising:
    an inner metal substrate on an inside of said cover normally closing said panel opening until forced to open by pressure from an inflating air bag upon deployment thereof to move outwardly through said opening;
    an outer substrate attached to said inner substrate for supporting an outer face of said cover generally matching said panel; and
    at least one cover attachment element formed of rigid metal extending along a horizontally extending edge of said cover and having at least one first portion disposed between said substrates and at least one second portion exposed to face a first edge of said opening for engagement with fastening means thereon for mounting said cover in a closed position over said opening.

2. The cover of claim 1, wherein:
    said inner substrate has a fastener access opening formed therein for permitting said fastening means to engage said at least one second portion of said cover attachment element for securing said cover in said closed position until deployment of said air bag.

3. The cover of claim 2, wherein:
    said inner substrate has a plurality of fastener access openings spaced apart along said first edge of said opening for permitting said fastening means to engage said cover attachment element at a plurality of second portions spaced apart thereon.

4. The cover of claim 3, wherein:
    said opening has a second opposite edge spaced from said first edge; and including
    a second of said cover attachment elements for extending along said second opposite edge of said and opening having at least one of said second portions exposed to face said second opposite edge of said panel opening for engagement with fastening means thereon.

5. The cover of claim 1, wherein:
    said inner substrate is formed with an elongated, outwardly open recess along an edge for receiving said attachment element disposed between said substrates.

6. The cover of claim 1, wherein:
    said cover attachment element is formed of a rigid metal rod.

7. The cover of claim 1, wherein:
    said cover attachment element has at least two first portions disposed between the substrates and separated by said at least one second portion.

8. A cover for covering an opening in a panel adjacent to an air bag inflator system, comprising:
    an inner metal substrate on an inside of said cover normally closing said panel opening until forced to open by pressure from an inflating air bag upon deployment thereof to move outwardly through said opening;
    an outer substrate attached to said inner substrate for supporting an outer face of said cover generally matching said panel;
    at least one cover attachment element formed of metal for extending along a first edge of said opening and having at least one first portion disposed between said substrates and at least one second portion exposed to face said first edge of said opening for engagement with fastening means thereon for mounting said cover in a closed position over said opening; and, wherein:
    said inner substrate is formed with an elongated, outwardly open recess along an edge for receiving said attachment element sandwiched between said substrates; and
    said inner substrate is formed with one or more transverse, outwardly open recesses normal to said elongated recess; and
    said attachment element has an end portion transverse to said elongated recess seated in said transverse recess.

9. A cover for covering an opening in a panel adjacent to an air bag inflator system, comprising:
    an inner metal substrate on an inside of said cover normally closing said opening until forced to open by pressure from an inflating air bag upon deployment thereof to move outwardly through said opening;
    an outer substrate attached to said inner substrate for supporting an outer face of said cover generally matching said panel;
    at least one cover attachment element formed of metal for extending along a first edge of said opening and having at least one first portion disposed between said substrates and at least one second portion exposed to face said first edge of said opening for engagement with fastening means thereon for mounting said cover in a closed position over said opening; wherein
    said inner substrate has a fastener access opening formed therein for permitting said fastening means to engage said second portion of said cover attachment element for securing said cover in said closed position until deployment of said air bag; and
    said inner substrate is formed with an elongated outwardly open recess along an edge for receiving said first portion of said attachment element and aligned with said fastener access opening.

10. The cover of claim 9, wherein:
    said second portion of said attachment element projects outwardly of said fastener access opening to engage said fastening means.

11. A cover for covering an opening in a panel adjacent to an air bag inflator system, comprising:

an inner metal substrate on an inside of said cover normally closing said opening until forced to open by pressure from an inflating air bag upon deployment thereof to move outwardly through said opening;

an outer substrate attached to said inner substrate for supporting an outer face of said cover generally matching said panel;

at least one cover attachment element formed of metal for extending along a first edge of said opening and having at least one first portion disposed between said substrates and at least one second portion exposed to face said first edge of said opening for engagement with fastening means thereon for mounting said cover in a closed position over said opening;

a tether attachment element having a first portion sandwiched between said inner and outer substrates and a second portion exposed for attachment to a tether; and at least one tether having a loop at an outer end portion extending around said second portion of said tether attachment element and having an inner end portion adapted for fixed attachment to limit the amount of movement of said cover away from the opening upon deployment of the air bag of the air bag inflator system.

12. The cover of claim 11, wherein:

said inner substrate is formed with an outwardly open recess for receiving said first portion of said tether attachment element and having a tether access opening aligned with said recess for permitting said tether looped around said second portion of said tether attachment element to pass therethrough.

13. A tethered cover for covering an opening in a panel adjacent to an air bag inflator system, comprising:

an inner metal substrate on an inside of said cover normally closing said opening until forced open by pressure from an inflating air bag expanding outwardly through said opening;

an outer substrate attached to said inner substrate for supporting an outer face of said cover generally matching said panel;

at least one flexible tether having an outer end portion for restraining travel of said cover away from said opening when said cover is opened by said air bag; and a tether attachment element of metal having an elongated first portion extending between said inner and outer substrates and a second portion exposed for attachment to said outer end portion of said at least one tether.

14. The tethered cover of claim 13, wherein:

said outer end portion of said at least one tether comprises a loop secured around said second portion of said attachment element.

15. The tethered cover of claim 13, wherein:

said inner substrate has a first tether access opening for permitting said second portion of said tether attachment element to pass therethrough for attachment to said outer end portion of said tether.

16. The tethered cover of claim 15, wherein:

said inner substrate has a second tether access opening spaced apart from said first tether access opening; and including a second flexible tether having an outer end portion secured to a further second portion provided on said tether attachment element and extended through said second tether access opening.

17. The tethered cover of claim 13, wherein:

said inner substrate is formed with an outwardly open recess for receiving said first portion of said tether attachment element extending between said inner and outer substrates.

18. The tethered cover of claim 17, wherein:

said inner substrate has a tether access opening which permits said at least one tether to be attached to said second portion of said tether attachment element, and said recess is in communication with said tether access opening.

19. The tethered cover of claim 13, wherein;

said tether attachment element is an elongated metal rod.

20. The tethered cover of claim 13, wherein:

said tether attachment element has at least two first portions disposed between the substrates and separated by said at least one second portion.

21. A tethered cover for covering an opening in a panel adjacent to an air bag inflator system, comprising:

an inner metal substrate on an inside of said cover normally closing said opening until forced open by pressure from an inflating air bag expanding outwardly through said opening;

an outer substrate attached to said inner substrate for supporting an outer face of said cover generally matching said panel;

at least one flexible tether having an outer end portion for restraining travel of said cover away from said opening when said cover is opened by said air bag; and a tether attachment element of metal having a first portion disposed between said inner and outer substrates and a second portion exposed for attachment to said outer end portion of said tether;

at least one elongated outwardly opening recess extending along an edge of said inner substrate in communication with a cover attachment element access opening; and an elongate cover attachment element formed of metal having a first portion in said recess sandwiched between said inner and outer substrates and having a second portion adjacent said cover attachment element access opening for engagement with fastening means adjacent an edge of the panel opening.

22. The tethered cover of claim 21 including:

another elongated outwardly opening recess extending along an opposite edge of said inner substrate in communication with a cover attachment access opening; and another elongate cover attachment element mounted in said another recess with a first portion sandwiched between said inner and outer substrate.

23. The tethered cover of claim 22, wherein:

said one and said another cover attachment elements are positioned on opposite sides of said tether attachment element.

24. The tethered cover of claim 23, wherein:

said tether attachment element comprises an elongate member with said second portion projecting through a tether access opening in said inner substrate engaged by said outer end portion of said tether.

25. A cover for covering an opening in a panel adjacent to an air bag inflator system, comprising:

an inner metal substrate on an inside of said cover normally closing said panel opening until forced to open by pressure from an inflating air bag upon deployment thereof to move outwardly through said panel opening;

an outer substrate attached to said inner substrate for supporting an outer face of said cover generally matching said panel; and at least one cover attachment element formed of metal for extending along a first edge of said panel opening and having at least one first portion disposed between said substrates and at least one second portion exposed to face said first edge of said panel opening for engagement with fastening means thereon for mounting said cover in a closed position over said panel opening; and said fastening means being substantially smaller in size than an engaging part of said second portion of said attachment element for permitting said cover to float relative to said panel opening.

26. The cover of claim 25, wherein:

said fastening means has a width in a horizontal direction substantially less than the horizontal length of said second portion of said attachment element for permitting relative floating action in a horizontal direction between said cover and said fastening means.

27. The cover of claim 25, wherein:

said second portion of said attachment element is offset inwardly of said first portion and is slightly rotatable relative thereto for permitting relative floating action of said cover over said panel opening in a vertical sense.

* * * * *

UNITED STATES PATENT AND TRADEMARK OFFICE
CERTIFICATE OF CORRECTION

PATENT NO. : 5,533,746
DATED : 9 July 1996
INVENTOR(S) : Timothy J. Whited

It is certified that error appears in the above-indentified patent and that said Letters Patent is hereby corrected as shown below:

```
column 7, line 7, "substrate 46" should be --substrate 40--.

column 7, line 45, "edge of said opening" should be
          --edge of opening--.

column 7, line 63, "a second of said cover" should be
          --a second cover--.

column 7, line 63, "attachment elements" should be
          --attachment element--.

column 7, line 64, "said and opening" should be
          --said opening and--.

column 7, line 66, "said panel opening" should be
          --said opening--.
```

Signed and Sealed this

Seventh Day of January, 1997

Attest:

BRUCE LEHMAN

*Attesting Officer*    *Commissioner of Patents and Trademarks*